US010021168B2

United States Patent
Hitomi et al.

(10) Patent No.: US 10,021,168 B2
(45) Date of Patent: Jul. 10, 2018

(54) APPLICATION STREAMING USING PIXEL STREAMING

(71) Applicant: Numecent Holdings, Inc., Irvine, CA (US)

(72) Inventors: Arthur S. Hitomi, Huntington Beach, CA (US); Dai Kobayashi, Irvine, CA (US); Doug Pfiffner, Anahiem Hills, CA (US); Osman Kent, Chertsey (GB)

(73) Assignee: Numecent Holdings, Inc., Irvine, CA (US)

( * ) Notice: Subject to any disclaimer, the term of this patent is extended or adjusted under 35 U.S.C. 154(b) by 535 days.

(21) Appl. No.: 14/024,584

(22) Filed: Sep. 11, 2013

(65) Prior Publication Data

US 2014/0136602 A1 May 15, 2014

Related U.S. Application Data

(60) Provisional application No. 61/699,443, filed on Sep. 11, 2012.

(51) Int. Cl.
*G06F 15/16* (2006.01)
*H04L 29/08* (2006.01)
(Continued)

(52) U.S. Cl.
CPC ............ *H04L 67/10* (2013.01); *H04L 65/605* (2013.01); *H04L 67/2823* (2013.01); *H04W 4/18* (2013.01); *H04W 4/60* (2018.02); *H04L 65/4092* (2013.01)

(58) Field of Classification Search
CPC ... H04L 67/10; H04L 67/2823; H04L 65/605; H04W 4/003; H04W 4/18; H04W 4/60
See application file for complete search history.

(56) References Cited

U.S. PATENT DOCUMENTS 5,860,012 A   1/1999  Luu
6,324,690 B1  11/2001 Luu
(Continued)

OTHER PUBLICATIONS

International Application No. PCT/US2013/022295, International Search Report and Written Opinion dated Apr. 15, 2013.
(Continued)

*Primary Examiner* — Jonathan A Bui
(74) *Attorney, Agent, or Firm* — Sheppard, Mullin, Richter & Hampton LLP

(57) ABSTRACT

Systems and methods for pixel streaming a stream-enabled application to a client device that is executed on an intermediary client device virtualization system. Portions of a stream-enabled application are used to begin execution of the stream-enabled application on the client device virtualization system. The output of the beginning of execution of the stream-enabled application are used to generate a pixel based stream-enabled application stream. The pixel-based stream-enabled application stream is sent to the client device. User interactions in response to the display of the stream are represented in user interaction data. The user interaction is determined from the user interaction data and application execution commands are determined based on the determined user interaction. Continued execution of the stream-enabled application occurs based on the application execution commands. The pixel-based stream-enabled application stream is modified according to the continued execution of the stream-enabled application.

20 Claims, 12 Drawing Sheets

(51) Int. Cl.
*H04W 4/18* (2009.01)
*H04L 29/06* (2006.01)
*H04W 4/60* (2018.01)

(56) References Cited

U.S. PATENT DOCUMENTS

| | | | |
|---|---|---|---|
| 6,343,313 B1 | 1/2002 | Salesky et al. | |
| 6,886,169 B2 | 4/2005 | Wei | |
| 6,917,963 B1 | 7/2005 | Hipp et al. | |
| 6,944,858 B2 | 9/2005 | Luu | |
| 7,200,632 B1* | 4/2007 | Greschler | H04L 67/34 709/203 |
| 7,210,147 B1 | 4/2007 | Hipp et al. | |
| 7,240,162 B2 | 7/2007 | de Vries | |
| 7,522,664 B1* | 4/2009 | Bhaskar | G01N 21/9501 348/126 |
| 7,577,751 B2 | 8/2009 | Vinson et al. | |
| 7,720,864 B1 | 5/2010 | Muth et al. | |
| 7,958,200 B2 | 6/2011 | McFadden et al. | |
| 8,117,600 B1 | 2/2012 | Roeck et al. | |
| 8,495,625 B1 | 7/2013 | Sanders | |
| 8,645,946 B2 | 2/2014 | Wookey | |
| 8,667,482 B2 | 3/2014 | Bernardi | |
| 8,712,959 B1 | 4/2014 | Lim et al. | |
| 8,768,800 B2 | 7/2014 | Milosavljevic et al. | |
| 9,171,002 B1 | 10/2015 | Mam et al. | |
| 9,516,094 B2* | 12/2016 | McDiarmid | G06F 9/44521 |
| 2001/0034736 A1 | 10/2001 | Eylon et al. | |
| 2003/0004882 A1 | 1/2003 | Holler et al. | |
| 2003/0126242 A1 | 7/2003 | Chang | |
| 2003/0140089 A1 | 7/2003 | Hines et al. | |
| 2003/0226138 A1 | 12/2003 | Luu | |
| 2004/0024845 A1 | 2/2004 | Fishhaut et al. | |
| 2005/0198647 A1 | 9/2005 | Hipp et al. | |
| 2006/0083308 A1* | 4/2006 | Schwarz | H04N 19/0003 375/240.16 |
| 2006/0122937 A1 | 6/2006 | Gatto et al. | |
| 2007/0083645 A1 | 4/2007 | Roeck et al. | |
| 2007/0130075 A1 | 6/2007 | Song et al. | |
| 2007/0254742 A1 | 11/2007 | O'Brien | |
| 2008/0005349 A1 | 1/2008 | Li et al. | |
| 2008/0120129 A1 | 5/2008 | Seubert et al. | |
| 2008/0163202 A1 | 7/2008 | Kembel et al. | |
| 2008/0165280 A1* | 7/2008 | Deever | H04N 7/0132 348/497 |
| 2008/0222659 A1 | 9/2008 | Brumme | |
| 2008/0228865 A1 | 9/2008 | Cruzada | |
| 2008/0301280 A1 | 12/2008 | Chasen et al. | |
| 2009/0109213 A1* | 4/2009 | Hamilton, II | A63F 13/12 345/419 |
| 2009/0158311 A1 | 6/2009 | Hon et al. | |
| 2009/0203368 A1 | 8/2009 | Marsyla et al. | |
| 2009/0204711 A1 | 8/2009 | Binyamin et al. | |
| 2010/0070526 A1 | 3/2010 | Matias | |
| 2010/0138475 A1 | 6/2010 | Frank et al. | |
| 2010/0235112 A1 | 9/2010 | Kesler et al. | |
| 2010/0235153 A1 | 9/2010 | Sharp et al. | |
| 2010/0250670 A1 | 9/2010 | Wei | |
| 2010/0333085 A1 | 12/2010 | Criddle et al. | |
| 2011/0063500 A1* | 3/2011 | Loher | H04N 7/183 348/445 |
| 2011/0066570 A1 | 3/2011 | Kolo et al. | |
| 2012/0066286 A1 | 3/2012 | Heredia et al. | |
| 2012/0110131 A1 | 5/2012 | Villagas Nunez et al. | |
| 2012/0144386 A1 | 6/2012 | Wookey | |
| 2012/0278439 A1* | 11/2012 | Ahiska | A63F 13/12 709/218 |
| 2012/0297311 A1* | 11/2012 | Duggal | G06F 9/468 715/740 |
| 2013/0045759 A1 | 2/2013 | Smith | |
| 2013/0007227 A1 | 3/2013 | Hitomi et al. | |
| 2013/0073775 A1* | 3/2013 | Wade | H04N 7/181 710/316 |
| 2014/0068022 A1 | 3/2014 | Kshirsagar et al. | |
| 2014/0136601 A1 | 5/2014 | Kent et al. | |
| 2014/0149558 A1* | 5/2014 | Quan | H04L 65/4084 709/219 |
| 2014/0169471 A1* | 6/2014 | He | H04N 19/56 375/240.16 |
| 2015/0081644 A1 | 3/2015 | Pitts | |
| 2016/0191677 A1* | 6/2016 | Tompkins | G06F 9/5072 709/203 |

OTHER PUBLICATIONS

International Application No. PCT/US2013/059316, International Search Report and Written Opinion dated Mar. 20, 2014.

* cited by examiner

US 10,021,168 B2

APPLICATION STREAMING USING PIXEL STREAMING

CROSS-REFERENCE TO RELATED APPLICATIONS

The present application claims priority to U.S. Provisional Application 61/699,443 entitled "Systems and Method of Application Modernization of Desktop Software Application Using Virtualization," filed Sep. 11, 2012, which is incorporated herein by reference.

BACKGROUND

An area of ongoing research and development is application delivery to computing devices. One aspect of application delivery is speed. Current application delivery platforms enable a device to download an application, which takes as much time as is required to accomplish the download, followed by an installation time. When the application is delivered from a relatively remote source, additional issues arise.

Another aspect of application delivery is security. Not all application delivery platforms offer the same amount of security in application delivery, piracy prevention, or the like. Other aspects of application delivery include network utilization, reduced power requirements for devices to which applications are delivered (and potentially for devices from which applications are delivered), and application and operating system performance consistency.

Downloading and installing an application is a simple way to obtain performance consistency, but this technique has other shortcomings. For example, there is often no effective piracy prevention in the delivery mechanism (though there can be piracy prevention through other techniques). This technique also means the device onto which the application is delivered must be capable of storing the application and running the application with sufficient speed such that users are not bothered by the performance. Network utilization is also limited to controlling the download, which essentially only impacts download times for a device without necessarily enabling load balancing to improve performance of all devices. These weaknesses with standard download/install have led to continuing research into virtual application delivery solutions.

Another area of ongoing research and development is asset delivery to computing devices, particularly devices largely designed to provide functionality based through a network connected (hereafter, referred to as "connected devices"), such as smart phones, tablets, and the like.

Other limitations of the relevant art will become apparent to those of skill in the art upon a reading of the specification and a study of the drawings.

SUMMARY

The following implementations and aspects thereof are described and illustrated in conjunction with systems, tools, and methods that are meant to be exemplary and illustrative, not necessarily limiting in scope. In various implementations one or more of the above-described problems have been addressed, while other implementations are directed to other improvements.

Various implementations include systems and methods for pixel streaming an application that is executed on an intermediary client device virtualization system to a client device. Specifically, portions of a stream-enabled application are received at the client device virtualization system from an application streaming system. The portions of the stream-enabled application are used to begin execution of the stream-enabled application on the client device virtualization system. The output of the beginning of execution of the stream-enabled application are used to generate a pixel based stream-enabled application stream. The pixel-based stream-enabled application stream is sent to the client device where the stream is displayed visually to a user. The user interacts with the client device or a system external to but coupled to the client device based on the display of the stream to the user. User interaction data is generated based on the user interaction and sent to the intermediary client device virtualization system.

The user interaction is determined from the user interaction data at the intermediary client device virtualization system. Application execution commands are determined based on the determined user interaction. The continued execution of the stream-enabled application occurs according to the determined application execution commands. The pixel-based stream-enabled application stream is modified according to the continued execution of the stream-enabled application. The modified pixel-based stream-enabled application stream is sent to the client device.

These and other advantages will become apparent to those skilled in the relevant art upon a reading of the following descriptions and a study of the several examples of the drawings.

DETAILED DESCRIPTION

Figure 1:
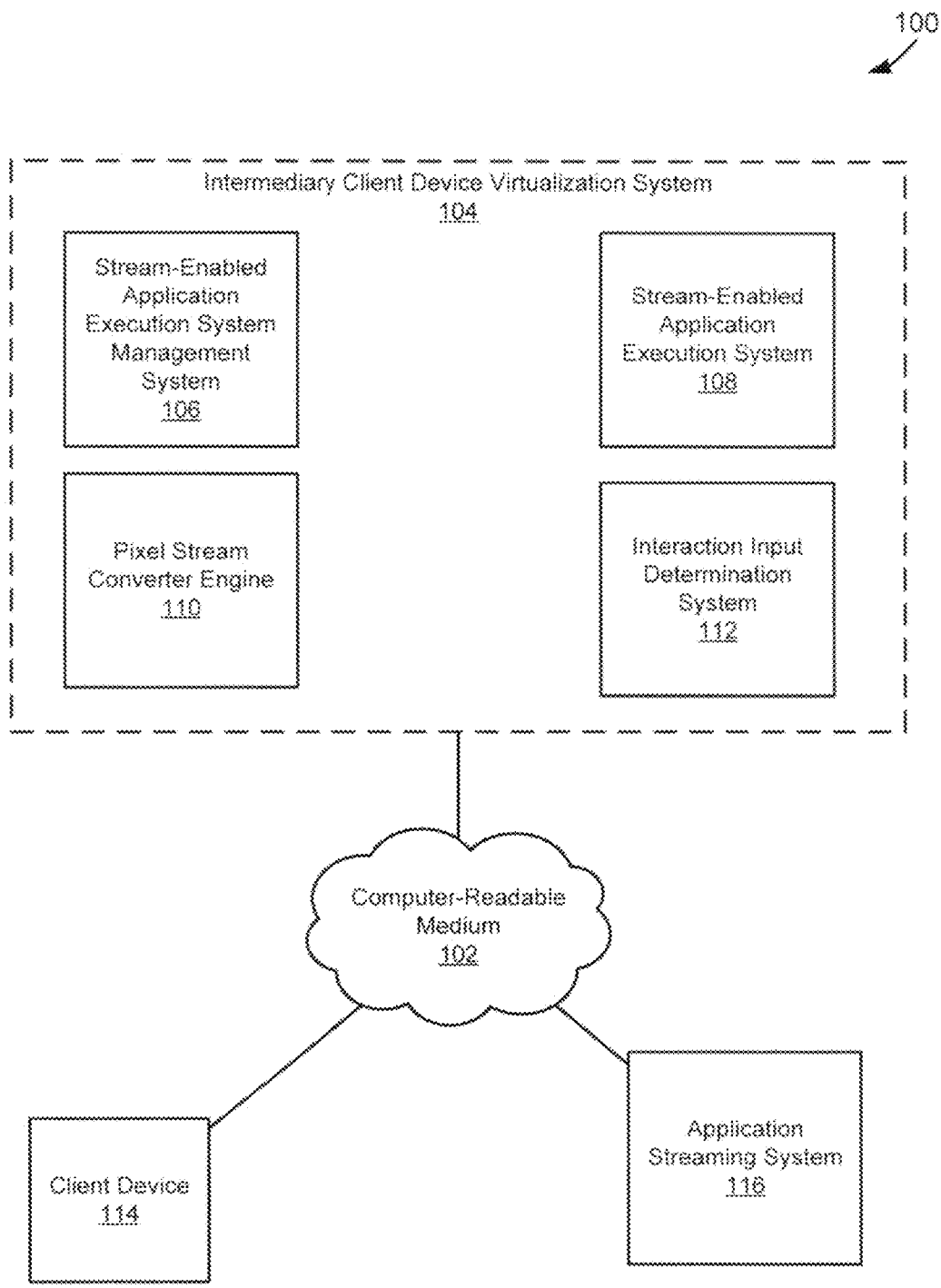
FIG. 1 depicts a diagram of an example of a system for pixel streaming a stream-enabled application to a client device.

FIG. 1 depicts a diagram 100 of an example of a system for pixel streaming a stream-enabled application to a client device. The system of the example of FIG. 1 includes a computer-readable medium 102, an intermediary client device virtualization system 104, a client device 114, and an application streaming system 116.

The intermediary client device virtualization system 104, the client device 114, and the application streaming system 116 are coupled to each other through the computer-readable medium 102. As used in this paper, a "computer-readable medium" is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

The computer-readable medium 102 is intended to represent a variety of potentially applicable technologies. For example, the computer-readable medium 102 can be used to form a network or part of a network. Where two components are co-located on a device, the computer-readable medium 102 can include a bus or other data conduit or plane. Where a first component is co-located on one device and a second component is located on a different device, the computer-readable medium 102 can include a wireless or wired back-end network or LAN. The computer-readable medium 102 can also encompass a relevant portion of a WAN or other network, if applicable.

The computer-readable medium 102, the intermediary client device virtualization system 104, the client device, the application streaming system 116, any other systems or devices described in this paper can be implemented as a computer system or parts of a computer system or a plurality of computer systems. A computer system, as used in this paper, is intended to be construed broadly. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

The memory can include, by way of example but not limitation, random access memory (RAM), such as dynamic RAM (DRAM) and static RAM (SRAM). The memory can be local, remote, or distributed. The bus can also couple the processor to non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. The I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, isdn modem, cable modem, token ring interface, satellite transmission interface (e.g. "direct PC"), or other interfaces for coupling a computer system to other computer systems. Interfaces enable computer systems and other devices to be coupled together in a network.

The computer systems can be compatible with or implemented as part of or through a cloud-based computing system. As used in this paper, a cloud-based computing system is a system that provides virtualized computing resources, software and/or information to client devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their client device.

A computer system can be implemented as an engine, as part of an engine or through multiple engines. As used in this paper, an engine includes at least two components: 1) a dedicated or shared processor and 2) hardware, firmware, and/or software modules that are executed by the processor. Depending upon implementation-specific or other considerations, an engine can be centralized or its functionality distributed. An engine can include special purpose hardware, firmware, or software embodied in a computer-readable medium for execution by the processor. The processor transforms data into new data using implemented data structures and methods, such as is described with reference to the FIGs. in this paper.

The engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices, and need not be restricted to only one computing device. In some embodiments, the cloud-based engines can execute functionalities and/or modules that end users access through a web browser or container application without having the functionalities and/or modules installed locally on the end-users' computing devices.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a general- or specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud-based datastore is a datastore that is compatible with cloud-based computing systems and engines.

The client device 114 can be any device through which a client can receive data. The data can be received from the intermediary client device virtualization system 104. In one example, the client device 114 is a thin client device or an ultra-thin client device. The client device 114 can include a wireless network interface, through which the client device 114 can receive data wirelessly from the intermediary client device virtualization system 104. More specifically, the client device 114 can function to receive pixel-based stream-enabled applications from the intermediary client device virtualization system 104.

Upon receiving the pixel-based stream-enabled application, the client device 114 can locally display, on a graphical user interface, a visual output representing the stream-enabled application, as it is run on the intermediary client device virtualization system 104, based on the received pixel-based stream-enabled application. Specifically, in locally displaying a visual output representing the stream-enabled application, as it is run on the intermediary client device virtualization system 104, the stream-enabled application is virtualized on the client device 114.

The client device 114 can also include interaction inputs for receiving, recording, and/or generating user interaction data of a user's interaction with the client device 114 or a system external to the client device 114 in response to viewing the visual output representing the virtualized stream-enabled application. Specifically, the user interaction data can represent a user's interaction with the client device 114 or a system external to the client device 114 in response to the execution of the stream-enabled application as if the stream-enabled application was actually executed on the client device 114.

The user interaction data can include captured gestures. The interaction input can be any system, device, or sensor that is capable of capturing a user interaction with the virtualized stream-enabled application in response to the visual output representing the stream-enabled application. In one example, the interaction input is a pressure sensor or a plurality of pressure sensors. The pressure sensor or plurality of pressure sensors can be used to detect finger movements or hand gestures made by a user of the client device 114. In another example, the interaction inputs include external devices that are removably coupled to the client device 114. Specifically, the interaction inputs can be a mouse, keyboard, or joystick. The user interaction can include the movement and/or activation of a mouse and the corresponding cursor within the display of the visual output of the virtualized stream-enabled application. In another example, the interaction input includes an accelerometer that can detect a movement of the client device 114 by the user in response to the visual output representing the virtualized stream-enabled application. In yet another example, the interaction input includes a motion sensor that can detect the motions of a user of the client device 114 in interacting with the client device 114.

The intermediary client device virtualization system 104 is in the same LAN as the client device 114. The intermediary client device virtualization system 104 includes a stream-enabled application execution system management engine 106, a stream-enabled application execution system 108, a pixel stream converter engine, and an interaction input determination system 112.

The intermediary client device virtualization system 104 can function to receive and locally run the stream-enabled applications that are virtualized on the client device 114 through a pixel-based stream-enabled application. Specifically, the stream-enabled application execution system 108 can function to execute a stream-enabled application locally within the same LAN as the client device 114. As understood herein, a "stream-enabled application" is an application (e.g., conventionally-coded application) that is broken into portions (e.g., blocks, chunks, pages, etc.), such that the application can be streamed on a per-portion basis to the intermediary client device virtualization system 104, where he application can be executed based on the streamed portions. For various implementations, the intermediary client device virtualization system 104 can initiate execution of a stream-enabled application once it has received a sufficient number of portions (e.g., portions received reach or surpass an executable threshold). As it continues execution of the stream-enabled application, the intermediary client device virtualization system 104 can request, and subsequently receive, additional portions of the stream-enabled application that the application streaming client does not already possess but possibly needs to continue the execution of the application. Generally, an application streaming server, which comprises some or all of the portions of the stream-enabled application, fulfills requests by the intermediary client device virtualization system 104 for additional portions of the stream-enabled application. Applications that can be stream-enabled can include games, document-based software (e.g., word processing or spreadsheets), operating systems, image-based software, video-based software, and the like.

The intermediary client device virtualization system 104 can request and receive the portions of the stream-enabled application that are locally available to the intermediary client device virtualization system 104 from the application streaming system 118. The application streaming system 116 can function to serve the pages or other data of a stream-enabled application to the intermediary client device virtualization system 104 in response to a request generated by the intermediary client device virtualization system 104. The request generated by the intermediary client device virtualization system 104 can be a specific request for exact group/block of pages of data for executing a stream-enabled application, or a general request for any group/block of pages needed to execute a stream-enabled application.

By returning data to a system, the application streaming system 116 acts to serve content to the intermediary client device virtualization system 104. Accordingly, in this example, the application streaming system 116 can be referred to as a content server. A web server, which is one type of content server, is typically at least one computer system that operates as a server computer system and is configured to operate with the protocols of the World Wide Web and is coupled to the Internet. Unless context dictates otherwise, a "server" as used in this paper includes at least a portion of a computer system running server software.

The intermediary client device virtualization system 104 can also function to generate a pixel-based stream-enabled application by transforming the output of the executed stream-enabled application into a pixel form. The intermediary client device virtualization system 104 can also function as a source of pixel streaming in sending the pixel-based stream-enabled application to the client device, so that the stream-enabled application can be virtualized on the client device 114. As the intermediary client device virtualization system 104 and the client device 114 are located in the same LAN, the source of pixel streaming is shifted closer to the client device 114, thereby obviating the need for GPU-equipped servers in some instances (e.g., traditional pixel-based game streaming).

Specifically, the pixel stream converter engine 110 can function to generate a pixel-based stream-enabled application based on the output of the stream-enabled application execution system 108 in executing a stream-enabled application. The pixel stream converter engine 110 can convert the output of the executed stream-enabled application into a pixel-based stream-enabled application according to a video compression protocol. In one example, the pixel stream converter engine 110 converts the output of the stream executed-enabled application generated by the stream-enabled execution system 108 according to the H.264 or advanced video coding (hereinafter referred to as "AVC") protocol. As the AVC protocol supports high definition encoding, the pixel-based stream-enabled application can be streamed as a high definition pixel stream. In creating a pixel-based stream-enabled application according to the AVC protocol, the stream can support a number of features.

Specifically, in one example, the pixel-based stream-enabled application can be created using up to 16 reference frames (or 32 reference fields, in the case of interlaced encoding) Variable block-size motion compensation (VBSMC) with block sizes as large as 16×16 and as small as 4×4, enabling precise segmentation of moving regions. In another example, the pixel stream converter engine 110 can create the pixel-based stream-enabled application by using spatial prediction from the edges of neighboring blocks for intra coding. Furthermore, the pixel stream converter engine 110 can convert the pixel-based stream-enabled application to include switching slices to allow an encoder to direct a decoder, located on the client device, to jump into an ongoing pixel based video stream The interaction input determination system 112 can function to determine the user interactions with the client device 114 or systems external to the client device based on user interaction data received from the interaction inputs of the client device 114. The user interactions can be made in response to the output that is displayed on the client device 114 according to the execution of the stream-enabled application that is virtualized on the client device according to the pixel-based stream-enabled application stream sent to the client device 114. The interaction input determination system 112 can also function to determine user application execution commands from the determined user interactions with the client device 114. For example, the interaction input determination system 112 can determine user application execution commands to move a cursor and activate a link within a pixel-based stream-enabled application that is run on the intermediary client device virtualization system 104.

The stream-enabled application execution system management system 106 can function to manage the stream-enabled application execution system 108 in executing the stream-enabled applications on the intermediary client device virtualization system 104. In one example, the stream-enabled application system management system 106 can manage the stream-enabled application execution system 108 according to user interactions determined by the interaction input determination system 112. Specifically, the interaction input determination system 112 can determine that the user interactions corresponding to the moving of a cursor icon and activation of a certain link. The application execution system management engine 106 can then instruct the stream-enabled application execution system 108 to execute the stream-enabled application according to the determined user interactions including the movement of the icon and activation of the link as is determined by the interaction input determination system 112.

The pixel stream converter engine 110 can then convert the output of the stream-enabled application generated by running the application on the intermediary client device virtualization system 104 into a pixel-based stream-enabled application. The pixel-based stream-enabled application, including changes as a result of the execution of the application according to the determined user interactions, is sent to the client device 114 where the user can further interact with the virtualized stream-enabled application, thereby created using user interaction data.

Figure 2:
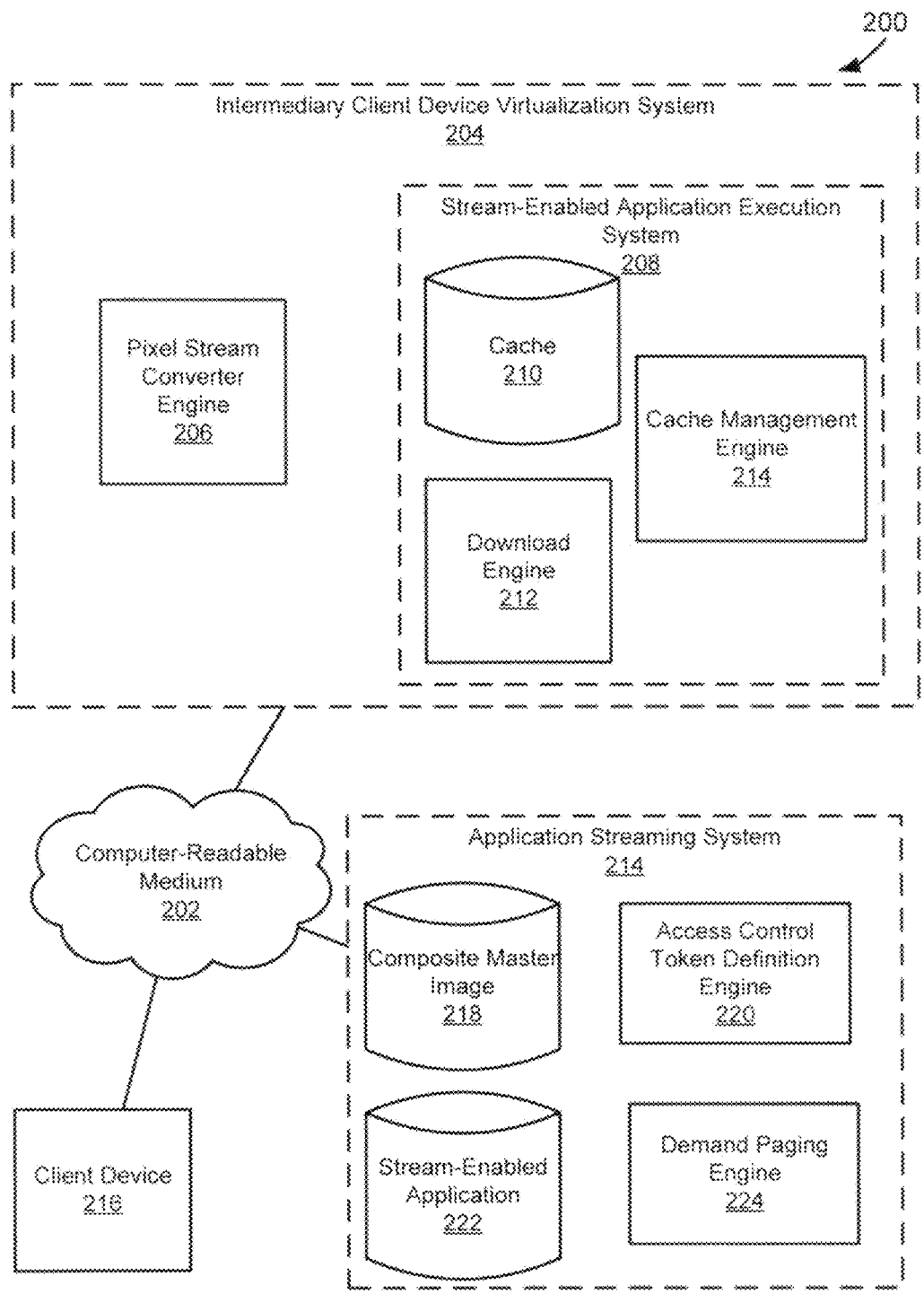
FIG. 2 depicts a diagram of another example of a system for pixel streaming a stream-enabled application to a client device.

FIG. 2 depicts a diagram 200 of another example of a system for pixel streaming a stream-enabled application to a client device. The system in FIG. 2 includes a computer-readable medium 202, an intermediary client device virtualization system 204, a client device 216, and an application streaming system 214. The intermediary client device virtualization system 204, the application streaming system 214, and the client device 216 are coupled to each other through the computer-readable medium 202.

The client device 216 can be any device through which a client can receive data, such as the client devices described in this paper. The intermediary client device virtualization system 204 can function according to any virtualization system, such as the intermediary client device virtualization systems described in this paper. The application streaming system 214 can function according to any application streaming system, such as the application streaming systems described in this paper.

The intermediary client device virtualization system 204 includes a pixel stream converter engine 206 and a stream-enabled application execution system 208. The pixel stream converter engine 206 can function according to any video encoder, such as the pixel stream converter engines described in this paper. The stream-enabled application execution system 208 can function according to any application execution system, such as the stream-enabled application execution systems described in this paper.

The stream-enabled application execution system 208 includes a cache datastore 210, a download engine 212, and a cache management engine 214. The application streaming system 214 includes a composite master image 218, an access control token definition engine 220, a stream-enabled application datastore 222, and a demand paging engine 224. The stream-enabled application datastore 222 contains the stream-enabled applications, including the portions of the stream-enabled applications.

The composite master image datastore 218 includes one or more images that can be provided to the intermediary client device virtualization system 204. The images include application snapshots on top of a machine. Thus, the images can be referred to as "application snapshots." Application snapshots can be made portable across at least some machines (or OSs if the application is sufficiently neutral, such as Java®). A snapshot engine (not shown) can take an initial snapshot of an environment before the application is run (unless the snapshot engine has access to an installation file from which an application install can be deconstructed, such as Android) then after installation in the cloud. The resultant package, including the application snapshot, can be invoked on a device or in the cloud using the environment snapshot, if needed.

The demand paging engine 224 can function to stream portions of a stream-enabled application (e.g., to the intermediary client device virtualization system 204) using a demand paging technique. The demand paging engine 224 can also function to deliver partial or full images from the composite master image datastore 218 to the intermediary client device virtualization system 204, including application snapshots. In some implementations, the demand paging engine 224 can also provide the intermediary client device virtualization system 204 with portions (e.g., jumpstart, prefetch, and/or predicted) of the stream-enabled application of an application that the stream-enabled application execution system 208 is executing or is intending to execute. Accordingly, the demand paging engine 224 can, in some implementations, fulfill request for portions of stream-enabled application as they are received from the intermediary client device virtualization system 204. The demand paging engine 224 can provide the portions of the stream-enabled application from the stream-enabled application datastore 222.

The access control token definition engine 220 can function to generate tokens to define access policies for the intermediary client device virtualization system 204. In a specific implementation, the access control token definition engine 220 can define access policies using digital rights management (DRM) functionality.

The download engine 212 can obtain an application snapshot from the application streaming system 214. The application snapshot informs the intermediary client device virtualization system 204 of what characteristics the application would have if installed on the intermediary client device virtualization system 204. The application snapshot also assists the intermediary client device virtualization system 204 with identifying what portions of the stream-enabled application are needed for the application to execute on the intermediary client device virtualization system 204 as if the applicable application is installed on the intermediary client device virtualization system 204. This enables the intermediary client device virtualization system 204 to act as if the applicable application is installed on the intermediary client device virtualization system 204 even when it is not. The download engine 212 can also obtain jumpstart partials, which include portions of the stream-enabled application that allow execution of the application to initiate and/or that have been determined to cause potential delay if not downloaded before the start of the streamed application (e.g., portions of the application that are inevitably run during an early part of an application's execution). The download engine 212 can include a content prefetcher that obtains portions of the streamed application from the application streaming system 214 in anticipation of needing the portions soon, or at least at some point in the future. The sensitivity of the content prefetcher (i.e., the probability that a portion of an application will be considered "likely" to be used soon or at least at some point in the future) can be configurable or unconfigurable, depending upon the implementation.

The stream-enabled application execution system 208 can run the stream-enabled application as if it were installed on the intermediary client device virtualization system 204. As used in this paper, installed is intended to mean "fully installed" such that executing the streamed application would not result in a system crash if an uninstalled portion of the application were accessed. As used in this paper, an application is intended to mean an executable (not simply data) program with at least one branch instruction. Due to the implementation of the downloaded application snapshot, the stream-enabled application execution system 208 "thinks" that the application is installed on the machine. In addition, the stream-enabled application execution system can capture requests for portions of the streamed application (or data) that are not locally available and instruct the download engine 212 to obtain the portions of the streamed application that are not locally available.

In a specific implementation, the stream-enabled application execution system 208 implements an access control policy from the application streaming system 214. The stream-enabled application execution system 208 can enforce, for example, DRM policies.

The cache management engine 214 can function to manage the cache datastore 210 to enable the stream-enabled application execution system 208 to satisfy requests using portions of the streamed application in the cache datastore 210. The download engine 212 can provide additional portions of the streamed application to the cache datastore 210 over time. The cache management engine 214 can clear portions of the cache datastore 210 over time in accordance with a cache management protocol (e.g., older entries can be deleted before newer entries).

The pixel stream converter engine 206 can function to generate a pixel stream based on the output from the stream-enabled application being executed by the stream-enabled application execution system 208, thereby creating a pixel-based stream-enabled application stream. The pixel stream converter engine 206 can provide the pixel-based stream-enabled application stream to the client device 216. The pixel stream converter engine 206 can utilize applicable known or convenient pixel streaming technologies in generating the pixel stream, including Remote Desktop Protocol (RDP), Remote Graphics Software (RGS), and the like.

Figure 3:
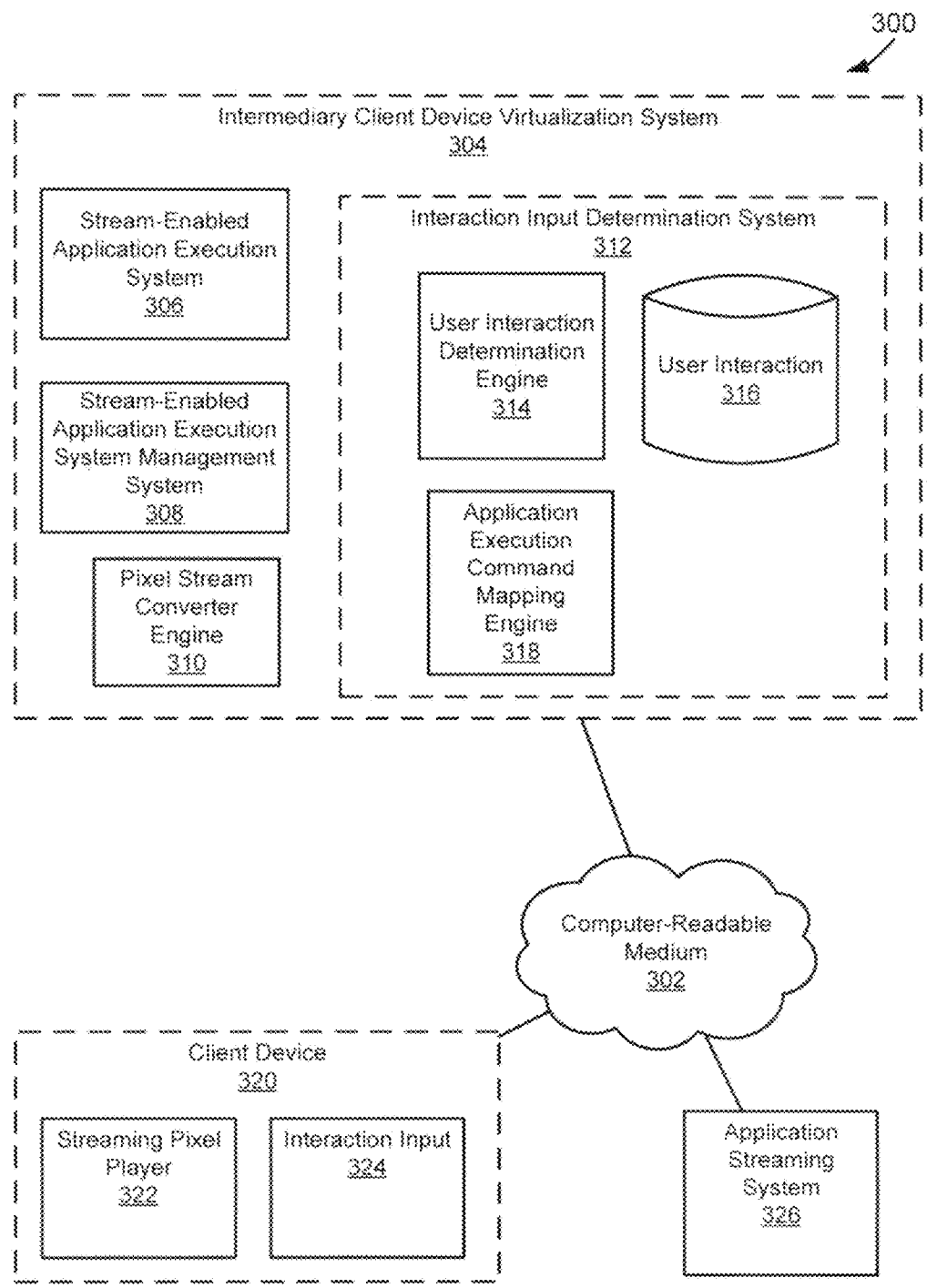
FIG. 3 depicts a diagram of an example of a system for running a virtualized stream-enabled application based on user interactions with a client device.

FIG. 3 depicts a diagram 300 of an example of a system for running a virtualized stream-enabled application based on user interactions with a client device. The system of FIG. 3 includes a computer-readable medium 302, an intermediary client device virtualization system 304, a client device 320, and an application streaming system 326. The intermediary client device virtualization system 304, the client device 320, and the application streaming system 326 are coupled to each other through the computer-readable medium 302.

The client device 320 can be any device through which a client can receive data, such as the client devices described in this paper. The intermediary client device virtualization system 304 can function according to any virtualization system, such as the intermediary client device virtualization systems described in this paper. The application streaming system 326 can function according to any application streaming system, such as the application streaming systems described in this paper.

The intermediary client device virtualization system 304 includes a stream-enabled application execution system 306, a stream-enabled application execution system management system 308, a pixel stream converter engine 310, and an interaction input determination system 312. The stream-enabled application execution system 306 can function according to any application execution system, including the stream-enabled application execution systems described in this paper. The stream-enabled application execution system management system 308 can function according to any application execution system management system, including the stream-enabled application execution system management systems described in this paper.

The client device 320 includes an interaction input 324. The interaction input can function to collect and or generate user interaction data. The client device 320 also includes a streaming pixel player 322 and an interaction input 324. The streaming pixel player 322 can function to provide pixel-based access to a stream-enabled application executing at the intermediary client device virtualization system 304, possibly on behalf of the client device 320. In providing pixel-based access, the streaming pixel player 322 can receive from the intermediary client device virtualization system 304 a pixel-based stream-enabled application stream generated based on the output of the stream-enabled application as it is executed on the intermediary client device virtualization system 304. The streaming pixel player can further display the pixel-based stream-enabled application stream to a user at the client device 320, for example, via a video display coupled to the client device 320.

The interaction input determination system 312 includes a user interaction determination engine 314, a user interaction datastore 316, and an application execution command mapping engine 318. The user interaction datastore 316 can store user interactions and corresponding application execution commands. The user interactions and corresponding application execution commands can be stored in the user interaction datastore 316 as XML. The application execution command can include any command performed on a device in executing an application. In one example, the application execution command is the movement of a mouse icon to a specific area within a graphical user interface. In another example, the application execution command is the movement of a player in a game, if the application is a game. The application execution commands and corresponding can be customizable in that they can be created by a specific user of the client device and utilized when the user uses the client device 320. For example, the user interaction can be two nods of the head of the user and the corresponding application execution command can be to activate a link. The user interactions and corresponding application executing commands can be unique to the specific type of client device 320. For example, if the client device 320 is an iPad® then a user interaction can be a two finger swipe across the screen and the application executing command can be to scroll up or down a page or window according to the direction that the two finger swipe occurred.

The user interaction determination engine 314 can function to determine a user interaction from the user interaction data received form the interaction input 324. The user interaction data can be sent to the intermediary client device virtualization system through http packets. For example, the user interaction determination engine 314 can determine that the user performed a two finger swipe across the screen of the client device 114 in interacting with the client device from the user interaction data that includes the pressure measurements across the screen of the client device 114. The application execution command mapping engine 318 can function to determine application execution commands corresponding to the user interaction determined by the user interaction determination engine 314. The application execution command mapping engine 318 can determined application execution commands by mapping the determined user interaction to the corresponding application execution commands stored in the user interaction datastore 316.

The stream-enabled application execution system management system 308 can function to control the execution of the application by the stream-enabled application execution system 306 based on the application execution commands determined by the application execution command mapping engine 318. For example, if the application execution commands specific to activate a link, then the stream-enabled application execution system 306 can activate the link according to the application execution commands. By controlling the stream-enabled application execution system 306 based on the application execution commands determined from a user's interactions with the client device 320 or a system external to the client device 320, the user interactions with the client device 320 are virtualized on the intermediary client device virtualization system 304.

Additionally, the stream-enabled application execution system 306 can function to retrieve additional pages or blocks of the stream-enabled application from the application streaming system 326 based on the application execution commands. For example, if the application execution commands require additional pages or blocks of the stream-enabled application that are not stored or accessible locally in order to execute the stream-enabled application according to the application execution commands, then the stream-enable application can request the necessary pages or blocks of the stream-enabled application from the application streaming system 326.

The pixel stream converter engine 310 can also function based on the application execution commands determined by the interaction input determination system 312. Specifically, in one example, the interaction input determination system 312 can determine an application execution command to zoom into a section of the output displayed on the client device 320 based on the pixel-based stream-enabled application stream. Furthermore, the application execution command can include a zoom factor and a zoom center based on the determined user interactions. The pixel stream converter engine 310, in response, can crop the image or images of the output of the stream-enabled application executed on the intermediary client device virtualization system 304 based on the zoom factor and a zoom center. Additionally, the pixel stream converter engine 310 can scale the cropped image or images of the output of the stream-enabled application executed on the intermediary client device virtualization system 304 according to the resolution of the client device. The pixel stream converter engine 310 can then transform the image or images into a pixel-based stream-enabled application and stream the pixel-based stream-enabled application to the client device 320.

Figure 4:
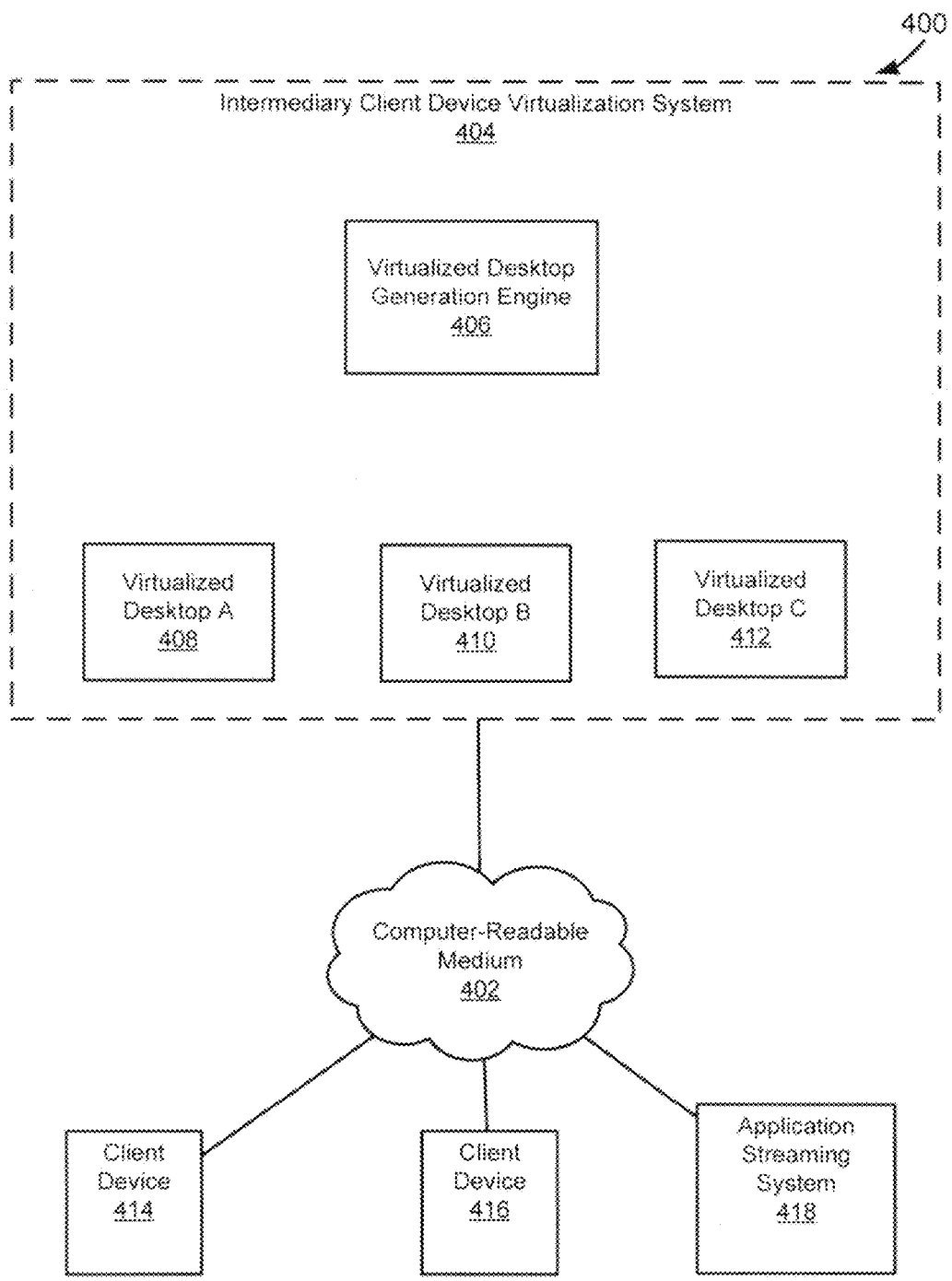
FIG. 4 depicts a diagram of an example of a system for pixel streaming stream-enabled applications to multiple client devices.

FIG. 4 depicts a diagram 400 of an example of a system for pixel streaming stream-enabled applications to multiple client devices. The example system in FIG. 4 includes a computer-readable medium 402, an intermediary client device virtualization system 404, a first client device 414, a second client device 416, and an application streaming system 418. The intermediary client device virtualization system 404, the first client device 414, the second client device 416, and the application streaming system 418 are coupled to each other through the computer-readable medium 402.

The first client device 414 and the second client device 416 can be any device through which a client can receive data, such as the client devices described in this paper. The intermediary client device virtualization system 404 can function according to any virtualization system, such as the intermediary client device virtualization systems described in this paper. The application streaming system 418 can function according to any application streaming system, such as the application streaming systems described in this paper.

The intermediary client device virtualization system 404 a virtualized desktop generation engine 406. The virtualized desktop generation engine 406 can function to create virtualized desktops for the client device 414 upon which stream-enabled applications can be executed. A stream-enabled application can be executed in each virtualized desktop. The output of the executed stream-enabled application can be used to form a pixel-based stream-enabled application stream that can be sent to the client devices.

The same stream-enabled application can be executed in multiple virtual desktops in virtualizing the stream-enabled application for multiple client devices. Additionally, different stream-enabled applications can be executed in multiple virtual desktops. In using multiple virtual desktops, multiple applications can be virtual executed in the intermediary client device virtualization system 404 for a single client device. A user of the client device can switch between the virtualized stream-enabled applications and user interaction data can be collected for each virtualized stream-enabled application. The user interaction data can be used to manage execution of the virtualized stream-enabled applications in the multiple virtualized desktops. Specifically, the stream-enabled application can be executed according to the user interaction data received from the client device.

In one example, virtualized desktop A can have Application A executed in it, the output of which is used to form a pixel-based stream-enabled application stream that is sent to the first client device 414. Furthermore, virtualized desktop B can have Application B executed in it, the output of which is used to form a pixel-based stream-enabled application stream that is sent to the first client device 414. Virtualized desktop C can have another instance of Application A executed in it, the output of which is used to form a pixel-based stream-enabled application stream that is sent to the second client device 416. The user interaction data in response to the display of the executed applications can be collected from the first client device 414 and the second client device 416 and used to control the execution of the applications and the instances of the applications in corresponding virtualized desktops A, B, and C.

Figure 5:
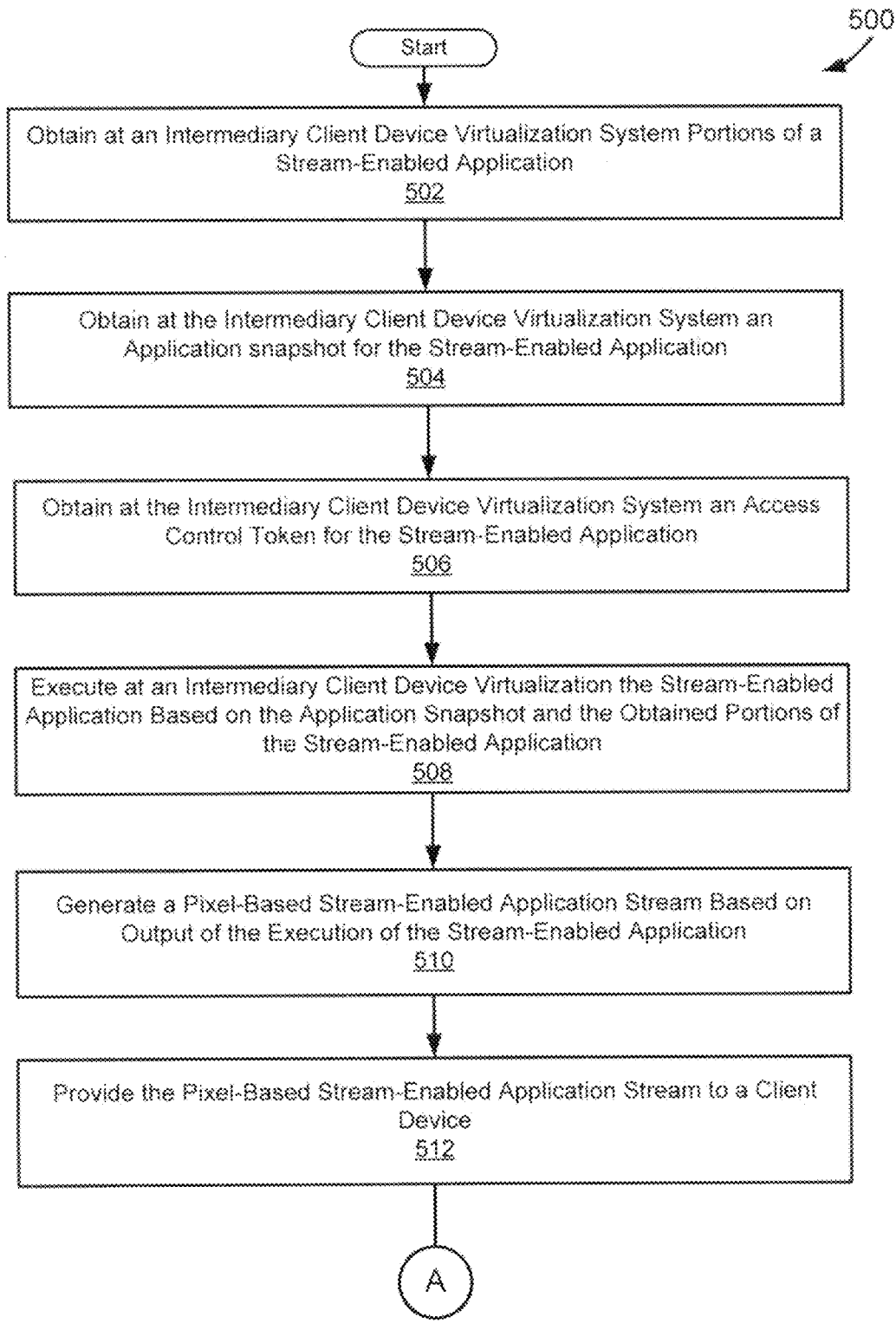
FIG. 5 depicts a diagram of a flowchart of a method of generating and sending a pixel-based stream-enabled application stream to a client device.

FIG. 5 depicts a diagram 500 of a flowchart of a method of generating and sending a pixel-based stream-enabled application stream to a client device. the flowchart 500 starts at module 502 with obtaining at an intermediary client device virtualization system portions of a stream-enabled application that is based on an application that is to be executed (e.g., at the intermediary client device virtualization system). As noted herein, a stream-enabled application is an application (e.g., conventionally-coded application) that is broken into portions (e.g., blocks, chunks, pages, etc.), such that the application can be streamed on a per-portion basis to an application streaming client and the application streaming client can execute the application based on the streamed portions.

An application streaming system can provide a subset of the portions to the intermediary client device virtualization system. The subset can include one or more jumpstart portions (also referred to herein as "jumpstart partials") of the stream-enabled application, prefetch portions of the stream-enabled application, predicted portions of the stream-enabled application (e.g., based on heuristics and/or portions fetches during previous executions), and/or one or more of the other portions of the stream-enabled application. For some implementations, the jumpstart portions can comprise sufficient portions of the application that permits an application streaming client to initiate execution of the application (e.g., for the first time on the application streaming client) without the remaining portions of the application. For some implementations, the portions of the application are made available after an application has been stream-enabled (e.g., broken up into portions) and the jumpstart portions have been identified (e.g., using the application snapshots).

In a specific implementation, the intermediary client device virtualization system can be allowed to store all of the portions of intermediary client device virtualization system or can be prevented from storing all of the portions of the stream-enabled application to make piracy more difficult (by not making all portions of the stream-enabled application readily available in a single location), to conserve resources at the proxy, or for other reasons. For some implementations, the intermediary client device virtualization system stores portions requested and obtained in a cache (e.g., for possible execution when the application streaming client is offline with respect to the application streaming server).

In the example of FIG. 5, the flowchart 500 continues to module 504 with obtaining at the intermediary client device virtualization system an application snapshot for the application. The application snapshot could be received from an application snapshot engine, which conceptually can be part of an application streaming system. In some implementations, the application snapshot could be provided through some other input device, such as removable storage. As noted herein, the application snapshot can enable an intermediary client device virtualization system to request portions of the stream-enabled application that are not already on the intermediary client device virtualization system (e.g., portions of the stream-enabled application that are needed in order to continue execution of the application). For some implementations, the requests for portions of the stream-enabled application could be provided by the intermediary client device virtualization system.

In the example of FIG. 5, the flowchart 500 continues to module 506 with obtaining at the intermediary client device virtualization system an access control token for the application. The access control token can be received from an access control token server, which can conceptually be considered part of an application streaming system. In some implementations, the access control token could be provided through some other input device, such as removable storage. Generally, the access control token obtained can determine the level of access to the application to be executed by an intermediary client device virtualization system. For example, the access control token can determine whether the intermediary client device virtualization system can initiate execution of the application and/or continue execution of an application (e.g., past a certain time after the jumpstart portions have been received and executed).

In the example of FIG. 5, the flowchart 500 continues to module 508 with executing the stream-enabled application at the intermediary client device virtualization system based on the application snapshot and the portions of the stream-enabled application obtained. Generally, execution of the application can be initiated at the intermediary client device virtualization system once the jumpstart portions of the stream-enabled application are received. For some implementations, the execution of the application could be initiated in a virtualized desktop residing on the intermediary client device virtualization system. For some implementations, the intermediary client device virtualization system can execute the application on behalf of another client to which the intermediary client device virtualization system intends to provide pixel-based access to the executing application.

Once executed, the intermediary client device virtualization system can continue execution of the application based on the additional portions of the stream-enabled application identified and obtained in accordance with the application snapshot. For example, the intermediary client device virtualization system can continue execution of the application based on the portions requested and obtained from the application streaming system necessary for the execution to not crash/halt (e.g., based on a lack of a needed file resource).

In the example of FIG. 5, the flowchart 500 continues to module 510 with generating a pixel-based stream-enabled application stream based on the output of the execution of the stream-enabled application. The pixel-based stream could be generated pixel stream converter engine in the intermediary client device virtualization system, which can receive an output (e.g., video output) from the application executing on the intermediary client device virtualization system.

In the example of FIG. 5, the flowchart 500 continues to module 512 with providing the pixel-based stream-enabled application stream generated to a client device. The client device can be configured to receive the pixel-based stream and display at the client device (e.g., through a video screen) the output of the executed stream-enabled application used to create the pixel-stream. In doing so, the client device can gain pixel-based access to the stream-enabled application executing on the intermediary client device virtualization system.

Figure 6:
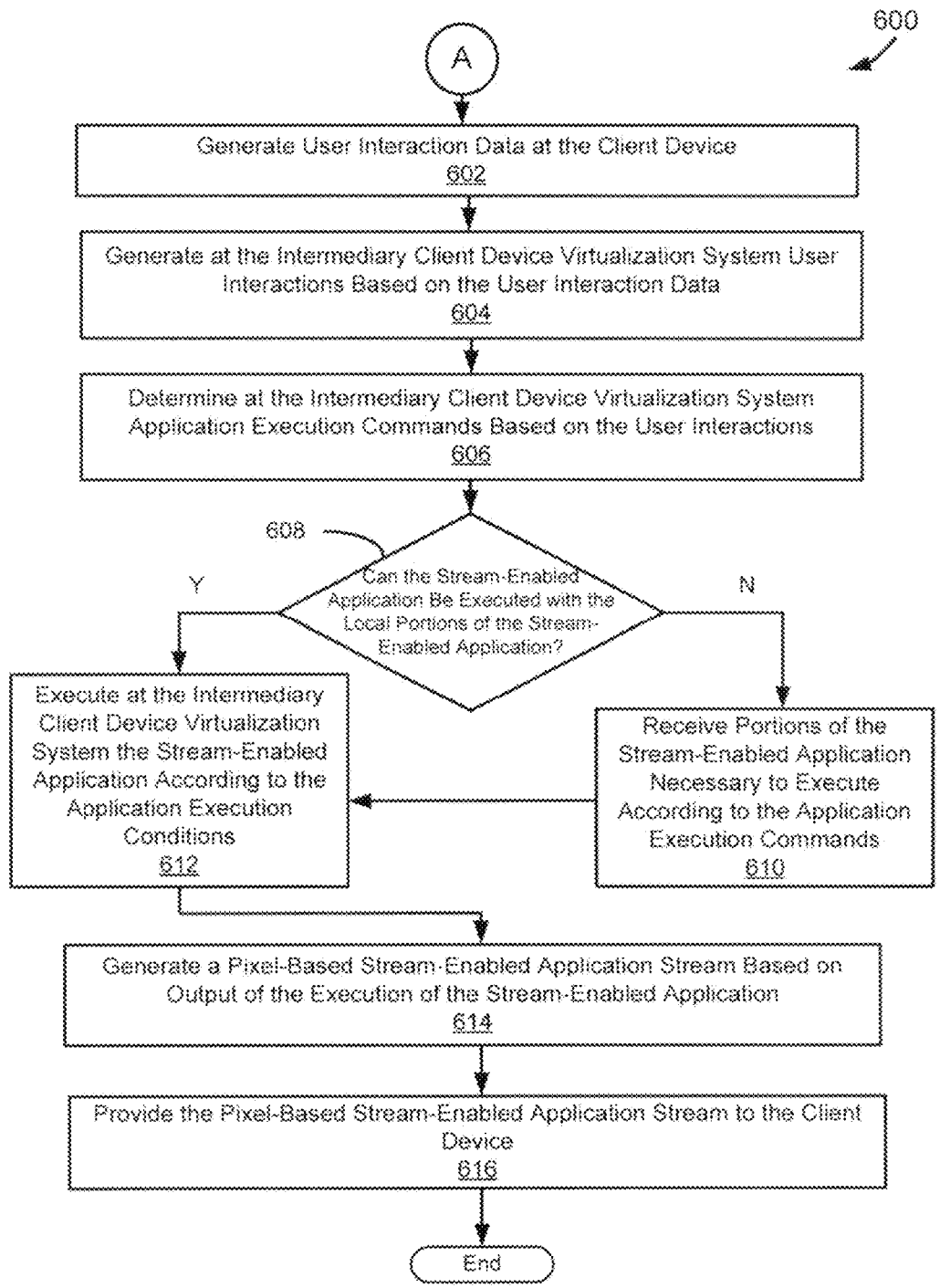
FIG. 6 depicts a diagram of a flowchart for executing a stream-enabled application based on user interactions with the client device or systems external to the client device.

FIG. 6 depicts a diagram 600 of a flowchart for executing a stream-enabled application based on user interactions with the client device or systems external to the client device. The flowchart begins at module 602, where user interaction data about the user interactions with the client device or a system external to but coupled to the client device are generated. The user interaction data is generated at the client device. The flowchart continues to module 604, where user interactions are determined at the intermediary client device virtualization system based on the user interaction data. The flowchart continues to module 606 where application execution commands are determined at the virtualization system based on the user interaction data.

The flowchart continues to decision point 608, whether it is determined whether the stream-enabled application can be executed according to the determined application execution commands based on the portions of the stream-enabled application locally available to the intermediary client device virtualization system. If it is determined that the stream-enabled application cannot be executed according to the application execution commands using the locally available portions of the stream-enabled application, then the flowchart continues to module 608 where the intermediary client device virtualization system receives the necessary portions of the stream-enabled application to execute the stream-enabled application according to the application execution commands. The necessary portions of the stream-enabled application are received at the intermediary client device virtualization system from an application streaming system. The flowchart then continues to module 612, where the stream-enabled application is executed at the intermediary client device virtualization system according to the application execution conditions. Alternatively, if it is determined at decision point 608 that the stream-enabled application can be executed according to the application execution commands using locally available portions of the stream-enabled application, then the flowchart continues to module 612, where the stream-enabled application is executed at the intermediary client device virtualization system according to the application execution conditions.

The flowchart continues to module 614, where a pixel-based stream-enabled application stream is generated at the intermediary client device virtualization system based on the output of the execution of the stream-enabled application at module 612. The flowchart continues to module 616, where the pixel-based stream-enabled application stream is provided to the client device.

Figure 7:
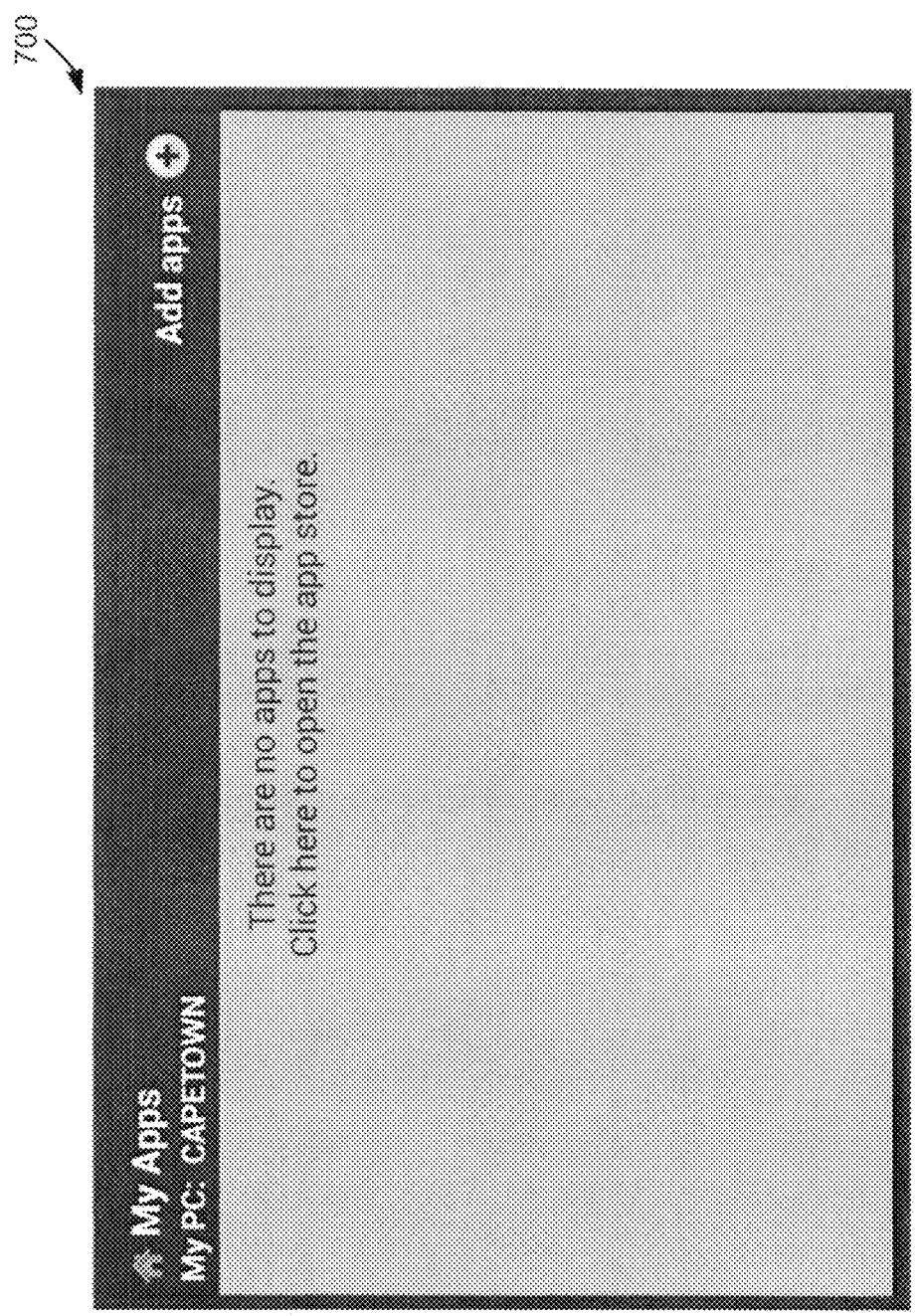
FIG. 7 depicts a diagram of a screen shot of a home interface the streaming pixel player with no applications loaded.

FIG. 7 depicts a diagram 700 of a screen shot of a home interface the streaming pixel player with no applications loaded. Specifically, the streaming pixel player is run on the client device. The home interface includes indicates that there are no applications available to be pixel streamed to the client device. Specifically, in not have any available applications virtual desktops have not been created to run a stream-enabled application on the intermediary client device virtualization system.

Figure 8:
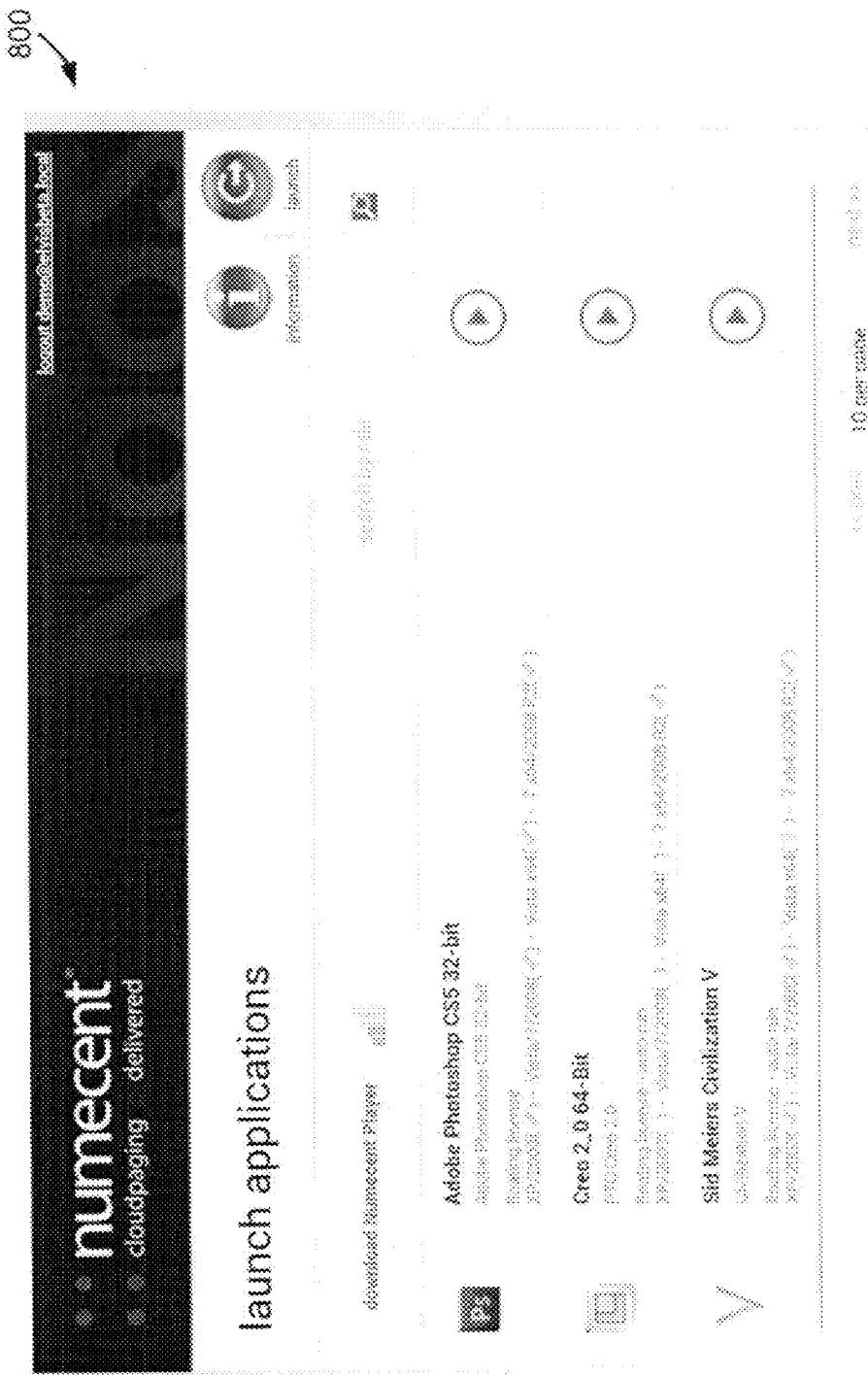
FIG. 8 depicts a diagram of a screen shot of an available application page.

FIG. 8 depicts a diagram 800 of a screen shot of an available application page. The available application page includes stream-enabled applications that the client device or a user of the client device can access. Whether a stream-enabled application can be accessed can be determined from an access token generated by access control token definition engine. The available application page also includes buttons through which a user can activate in order to begin the process of virtualizing the stream-enabled application on the intermediary client device virtualization system. Virtualizing can include received the portions of the stream-enabled application that are necessary to begin and continue execution of the stream-enabled application without receiving an error.

Figure 9:
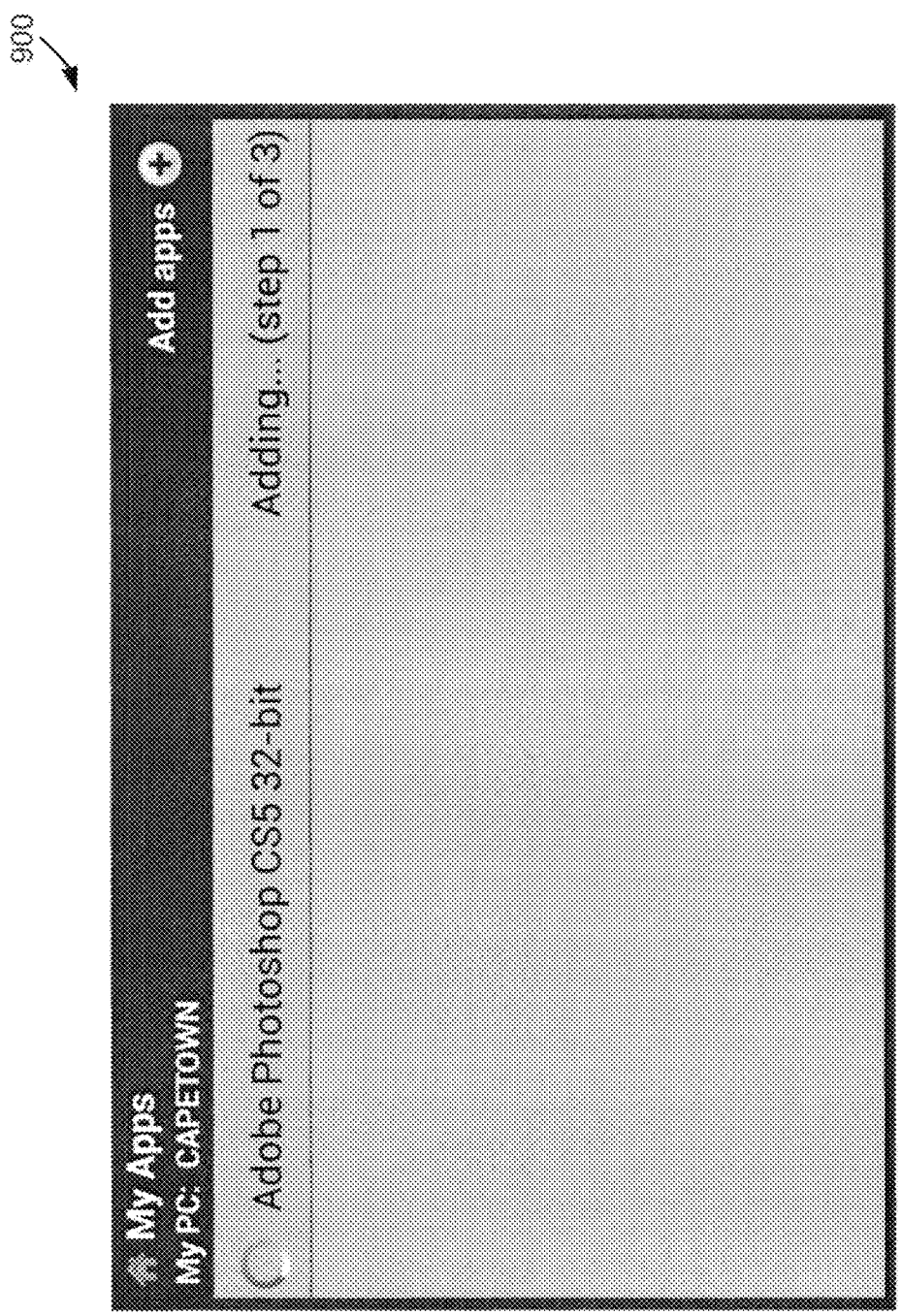
FIG. 9 depicts a diagram of a screen shot of an stream-enabled application virtualization progress page.

FIG. 9 depicts a diagram 900 of a screen shot of an stream-enabled application virtualization progress page. The stream-enabled application virtualization progress page includes the status of adding the selected stream-enabled application. The adding can include generating a virtualized desktop and begin on the intermediary client device virtualization system.

Figure 10:
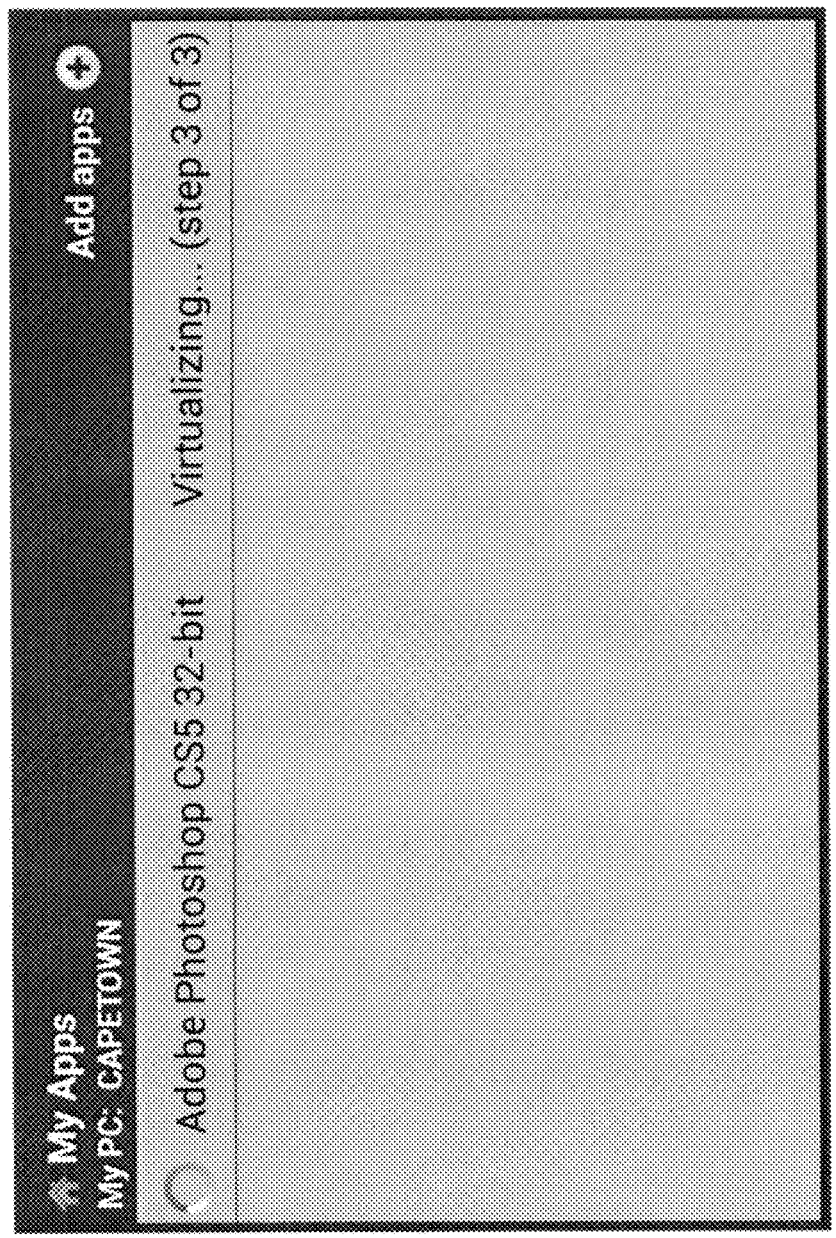
FIG. 10 depicts a diagram of another screen shot of the stream-enabled application virtualization progress page.

FIG. 10 depicts a diagram 1000 of another screen shot of the stream-enabled application virtualization progress page. The progress page includes a status message indicating that the last step of virtualizing the selected stream-enabled application is being performed. The last step of virtualizing can include receiving all of the portions of the stream-enabled application necessary to begin and continue execution of the stream-enabled application on the intermediary client device virtualization system.

Figure 11:
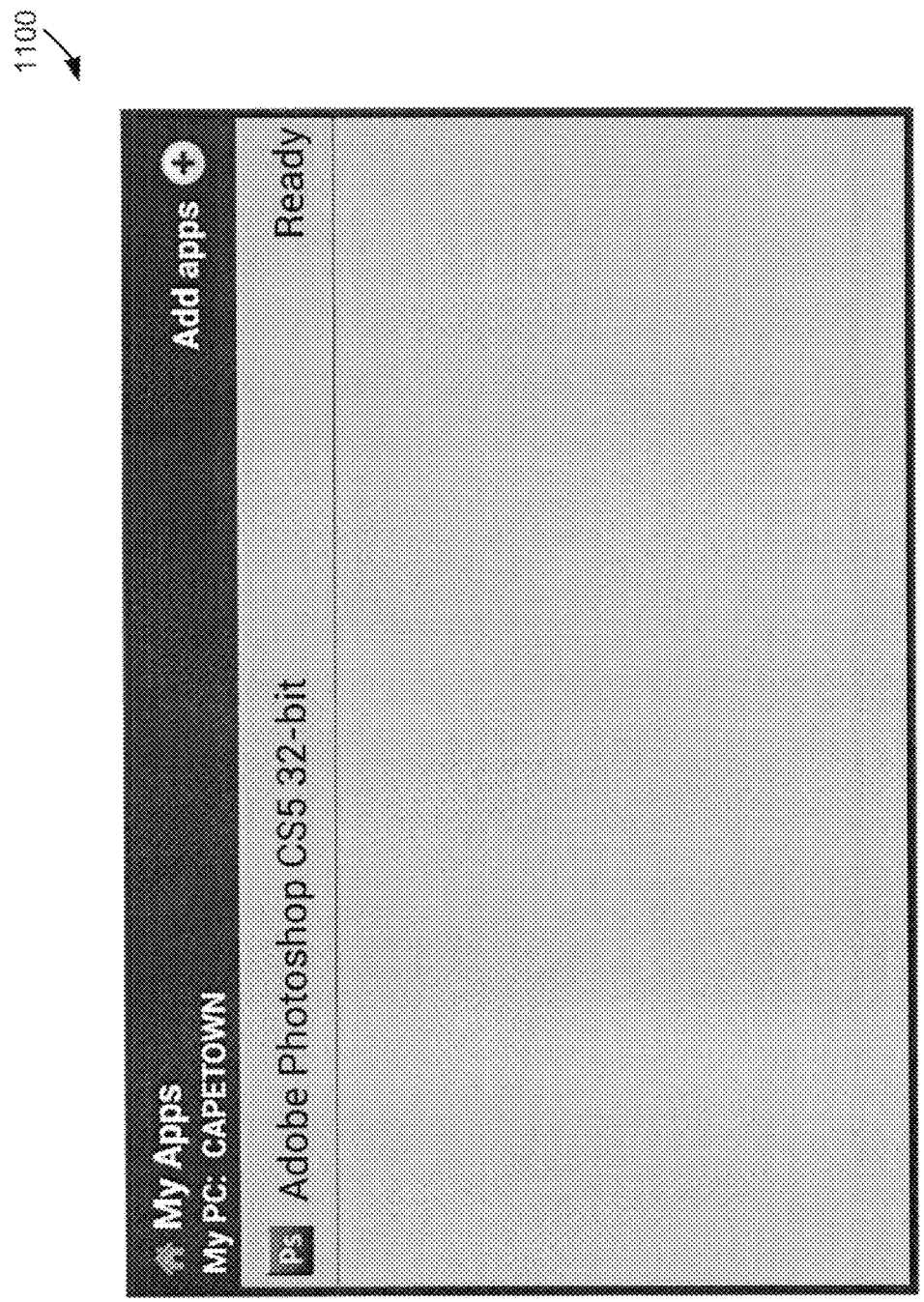
FIG. 11 depicts a diagram of another screen shot of the stream-enabled application virtualization progress page.

FIG. 11 depicts a diagram 1100 of another screen shot of the stream-enabled application virtualization progress page. Specifically, the progress page includes a status message indicating that the selected stream-enabled application is ready for execution on the intermediary client device virtualization system.

Figure 12:
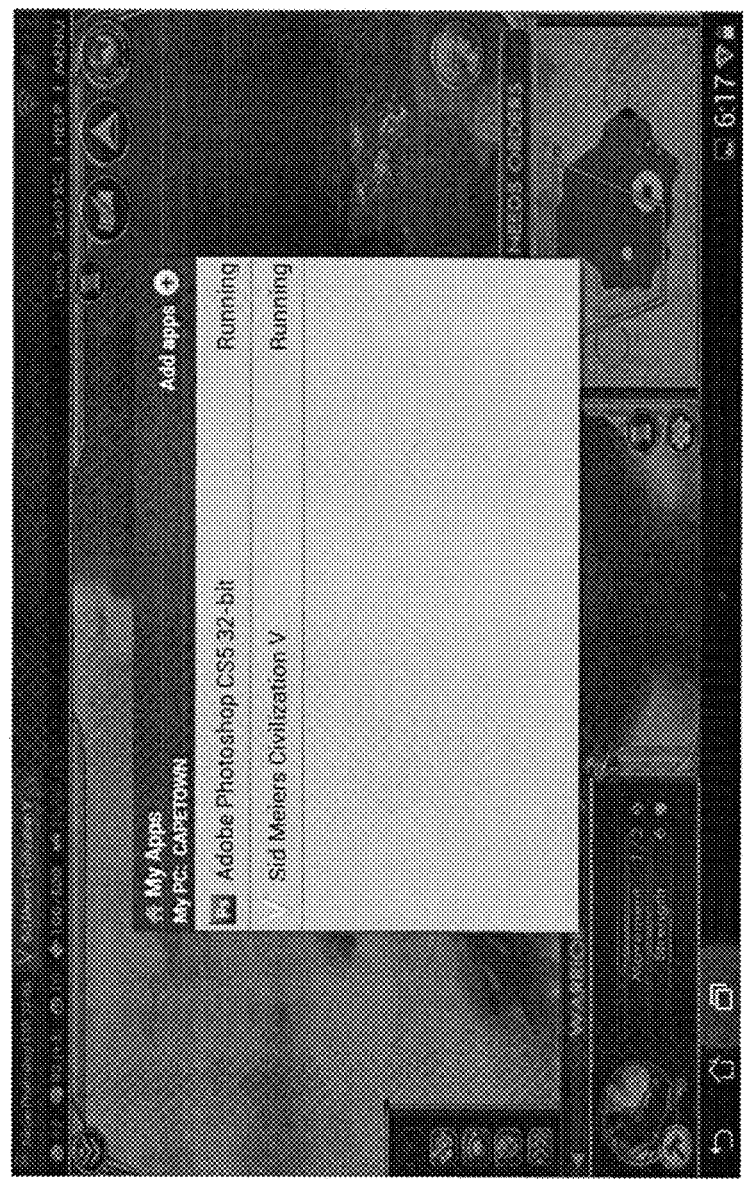
FIG. 12 depicts a diagram of a screen shot of a display of a pixel-based stream-enabled application stream run in a streaming pixel player on the client device.

FIG. 12 depicts a diagram 1200 of a screen shot of a display of a pixel-based stream-enabled application stream run in a streaming pixel player on the client device. Specifically, the screen shot shows a display of one of the pixel-based stream-enabled applications. The display also shows that a pixel-based stream-enabled application stream for another stream-enabled application is being run on the streaming pixel player. The user of the client device can access the display of the other stream-enabled application by clicking a tab.

These and other examples provided in this paper are intended to illustrate but not necessarily to limit the described implementation. As used herein, the term "implementation" means an implementation that serves to illustrate by way of example but not limitation. The techniques described in the preceding text and figures can be mixed and matched as circumstances demand to produce alternative implementations.

We claim:

1. A method comprising:
   receiving portions of a stream-enabled application, at a client device virtualization system;
   beginning execution of the stream-enabled application at the client device virtualization system by using the received portions of the stream-enabled application;
   generating a pixel-based stream-enabled application stream based on a beginning output of the beginning execution of the stream-enabled application;
   sending the pixel-based stream-enabled application stream to a client device;
   receiving user interaction data based on a user of the client device interacting with a display of the pixel-based stream-enabled application stream;
   determining a user interaction from the user interaction data;
   determining application execution commands based on the determined user interaction;
   determining whether or not the stream-enabled application can be executed according to the application execution commands by using the received portions of the stream-enabled application;
   upon determining that the stream-enabled application can be executed according to the application execution commands by using the received portions of the stream-enabled application,
      continuing execution of the stream-enabled application at the client device virtualization system according to the determined application execution commands;
      modifying the pixel-based stream-enabled application stream based on a continued output of the continuing execution of the stream-enabled application;
      sending the modified pixel-based stream-enabled application stream to the client device;
   upon determining that the stream-enabled application cannot be executed according to the application execution commands by using the received portions of the stream-enabled application,
      receiving additional portions of the stream-enabled application at the client device virtualization system;
      continuing execution of the stream-enabled application at the client device virtualization system by using the additional portions of the stream-enabled application.

2. The method of claim 1, wherein the pixel-based stream-enabled application stream is created according to an H.264 protocol.

3. The method of claim 1, wherein the pixel-based stream-enabled application stream is created using up to 16 reference frames.

4. The method of claim 1, wherein the pixel-based stream-enabled application stream is created using spatial prediction from edges of neighboring blocks in the pixel-based stream-enabled application stream.

5. The method of claim 1, wherein the pixel-based stream-enabled application stream includes switching slices.

6. The method of claim 1, wherein the pixel-based stream-enabled application stream is cropped according to a resolution of the client device.

7. The method of claim 1, wherein the application execution commands include a zoom factor and a zoom center based on the determined user interaction.

8. The method of claim 1, wherein the pixel-based stream-enabled application stream is created, at least in part, using at least one master image of the stream-enabled application.

9. The method of claim 1, further comprising receiving portions of the stream-enabled application at the client device virtualization system agnostic as to the determined user interaction, the portions of the stream-enabled application used to generate, at least in part, the pixel-based stream-enabled application stream according to the determined user interaction.

10. The method of claim 1, further comprising:
    providing access control tokens defining access rights to the stream-enabled application to the client device virtualization system;
    managing access to the stream-enabled application through the pixel-based stream-enabled application stream using the access control tokens.

11. A system comprising:
    a client device virtualization system configured to:
       receive portions of a stream-enabled application, at the client device virtualization system;

begin execution the stream-enabled application at the client device virtualization system;

a pixel stream converter engine configured to:

generate a pixel-based stream-enabled application stream based on a beginning output of the beginning execution of the stream-enabled application;

send the pixel-based stream-enabled application stream to a client device;

the client device virtualization system further configured to:

receive user interaction data based on a user of the client device interacting with a display of the pixel-based stream-enabled application stream;

determine a user interaction from the user interaction data;

determine application execution commands based on the determined user interaction;

determine whether or not the stream-enabled application can be executed in accordance with the application execution commands, using the received portions of the stream-enabled application;

upon determining that the stream-enabled application can be executed in accordance with the application execution commands, continue execution of the stream-enabled application according to the determined application execution commands;

cause the pixel stream converter engine to modify the pixel-based stream-enabled application stream based on a continued output of the continuing execution of the stream-enabled application, and send the modified pixel-based stream-enabled application stream to the client device;

upon determining that the stream-enabled application cannot be executed in accordance with the application execution commands, receive additional portions of the stream-enabled application at the client device virtualization system;

continue execution of the stream-enabled application at the client device virtualization system using the additional portions of the stream-enabled application.

12. The system of claim 11, wherein the pixel stream converter engine is further configured to create the pixel-based stream-enabled application stream according to an H.264 protocol.

13. The system of claim 11, wherein the pixel stream converter engine is further configured to create the pixel-based stream-enabled application stream using up to 16 reference frames.

14. The system of claim 11, wherein the pixel stream converter engine is further configured to create the pixel-based stream-enabled application stream using spatial prediction from edges of neighboring blocks in the pixel-based stream-enabled application stream.

15. The system of claim 11, wherein the pixel-based stream-enabled application stream includes switching slices.

16. The system of claim 11, wherein the pixel stream converter engine is further configured to crop the pixel-based stream-enabled application stream according to a resolution of the client device.

17. The system of claim 11, wherein the application execution commands include a zoom factor and a zoom center based on the determined user interaction and wherein the pixel stream converter engine is further configured to create the pixel-based stream-enabled application stream according to the zoom factor and the zoom center.

18. The system of claim 11, wherein the pixel-based stream-enabled application stream is created, at least in part, using at least one master image of the stream-enabled application.

19. The system of claim 11, wherein the client device virtualization system is further configured to receive portions of the stream-enabled application agnostic as to the determined user interaction, the portions of the stream-enabled application used to generate, at least in part, the pixel-based stream-enabled application stream according to the determined user interaction.

20. The system of claim 11 wherein the client device virtualization system is further configured to:

receive access control tokens defining access rights to the stream-enabled application;

manage access to the stream-enabled application through the pixel-based stream-enabled application stream using the access control tokens.

* * * * *